(12) United States Patent
Nguyen et al.

(10) Patent No.: US 11,733,416 B2
(45) Date of Patent: Aug. 22, 2023

(54) AUTOMATED HORIZON LAYER EXTRACTION FROM SEISMIC DATA FOR WELLBORE OPERATION CONTROL

(71) Applicant: Landmark Graphics Corporation, Houston, TX (US)

(72) Inventors: Xuan Nam Nguyen, Katy, TX (US); Xuewei Tan, Sugar Land, TX (US)

(73) Assignee: Landmark Graphics Corporation, Houston, TX (US)

( * ) Notice: Subject to any disclaimer, the term of this patent is extended or adjusted under 35 U.S.C. 154(b) by 205 days.

(21) Appl. No.: 17/131,072

(22) Filed: Dec. 22, 2020

(65) Prior Publication Data

US 2022/0196863 A1    Jun. 23, 2022

(51) Int. Cl.
*G01V 1/34* (2006.01)
*G01V 1/30* (2006.01)

(52) U.S. Cl.
CPC .............. *G01V 1/345* (2013.01); *G01V 1/301* (2013.01); *G01V 2210/643* (2013.01)

(58) Field of Classification Search
CPC ... G01V 1/345; G01V 1/301; G01V 2210/643
USPC ......................................................... 702/14
See application file for complete search history.

(56) References Cited

U.S. PATENT DOCUMENTS

| 5,153,858 | A | 10/1992 | Hildebrand |
| 8,065,088 | B2 | 11/2011 | Dorn et al. |
| 8,219,322 | B2 | 7/2012 | Monsen et al. |
| 8,566,069 | B2 | 10/2013 | Pauget et al. |
| 8,688,757 | B2 | 4/2014 | Wagner et al. |
| 9,182,511 | B2 | 11/2015 | Neave |
| 9,759,826 | B2 | 9/2017 | Mallet et al. |
| 2004/0068377 | A1* | 4/2004 | Charron ................. G01V 1/003 702/14 |

(Continued)

FOREIGN PATENT DOCUMENTS

| CN | 102981182 B | * | 4/2015 |
| CN | 104181596 A | * | 1/2017 |

OTHER PUBLICATIONS

English Abstract of CN 102981182, Apr. 1, 2015. (Year: 2015).*

(Continued)

*Primary Examiner* — Michael P Nghiem
(74) *Attorney, Agent, or Firm* — Kilpatrick Townsend & Stockton LLP

(57) ABSTRACT

A method includes receiving a seismic data volume comprising seismic information of subterranean formations and receiving a set of seismic traces of the seismic data volume. The method also includes, determining, along each seismic trace of the set of seismic traces, a set of seed points comprising minimum or maximum onsets. Further, the method includes sorting the set of seed points into a sorted set of seed points by absolute amplitude values of the set of seed points. Furthermore, the method includes generating a horizon representation of every seismic event in the seismic data volume by automatically tracking horizons throughout an entirety of the seismic data volume from the sorted set of seed points in an order of the absolute amplitude values of the sorted set of seed points. Additionally, the method includes generating a graphical user interface that includes the horizon representation for display on a display device.

20 Claims, 9 Drawing Sheets

(56) References Cited

U.S. PATENT DOCUMENTS

| | | | |
|---|---|---|---|
| 2004/0260476 A1 | 12/2004 | Borgos et al. | |
| 2010/0214870 A1* | 8/2010 | Pepper | G06T 7/187 367/72 |
| 2014/0303897 A1 | 10/2014 | James | |
| 2016/0209530 A1 | 7/2016 | Nguyen et al. | |
| 2020/0049845 A1* | 2/2020 | Nguyen | G01V 1/301 |
| 2020/0049846 A1 | 2/2020 | Nguyen et al. | |
| 2020/0363547 A1 | 11/2020 | Chan et al. | |
| 2022/0091292 A1* | 3/2022 | Nguyen | G01V 1/307 |

OTHER PUBLICATIONS

English translation of CN 104181596, 2014. (Year: 2014).*
PCT Application No. PCT/US2020/066840, "International Search Report and Written Opinion", dated Aug. 20, 2021, 10 pages.
Cader, "Geoteric's Adaptive Horizons", Jul. 6, 2017, 14 pages.
DGB Beheer, "OpendTect Pro and dGB Plugins Documentation 6.4", 2019, 7 pages.
Ellis, "Stratal-Slicing", Nov. 16, 2020, 2 pages.
Emerson, "Global Interpretation—Automated Seismic Interpretation and Model Building Using all of the Seismic Data", 2020, 2 pages.

* cited by examiner

AUTOMATED HORIZON LAYER EXTRACTION FROM SEISMIC DATA FOR WELLBORE OPERATION CONTROL

TECHNICAL FIELD

The present disclosure relates generally to wellbore operations. More specifically, but not by way of limitation, this disclosure relates to exploring subterranean formations for the presence of hydrocarbons.

BACKGROUND

Seismic surveys may be used in the oil and gas industry for exploring subsurface geology to identify a hydrocarbon bearing formation. Seismic waves may be transmitted below the surface of the earth and reflected off of subterranean structures. Reflected signals may from the subterranean structures may return to the surface where the reflected signals are detected by sensors. Data from the sensors may be used to determine locations of various subsurface features that may trap oil, such as fault or fold structures. The data from the sensors is processed to produce 3D volume data sets of seismic traces. The volumes include a seismic attribute value at specified (x, y, z) locations within a geographic space.

Traditionally, seismic interpreters manually select a small number of seismic events to pick as horizons in a seismic volume. The manual interpretations of individual seismic events or horizons can extend throughout a seismic data volume using waveform auto-tracking techniques. However, utilizing traditional auto-tracking techniques for subsurface mapping and trap definition workflows may be inadequate and overly time consuming for more advanced workflows, such as reservoir characterization and stratigraphic studies. For example, the more advanced workflows may require a large number of seismic events per volume and per trace that need to be chosen consistently.

DETAILED DESCRIPTION

Figure 1A:
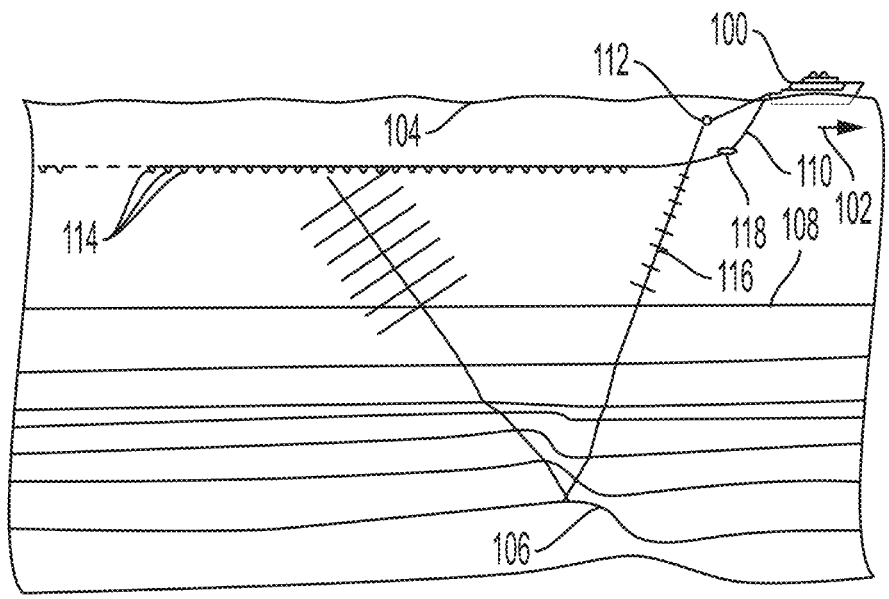
FIG. 1A is a cross-sectional view of an example of a marine seismic survey environment according to some aspects of the present disclosure.

Certain aspects and features of the present disclosure relate to automatically extracting horizons from a seismic data volume of a seismic survey. The seismic data volume may represent data collected in the seismic survey that represents a region of a composition of subterranean formations. The horizons may represent changes in subsurface formation type or formation characteristics that can be extracted from the seismic data volume. Automated and accurate extraction of the horizons from the seismic data volume may enable enhanced understanding of subterranean formations. The enhanced understanding of the subterranean formations provided by the accurate extraction of the horizons is used in well-planning operations and reduces costs associated with interpreting the information represented in the seismic data volume.

In an example, automatically extracting the horizons from the seismic data volume may involve automatically generating seed points of the seismic data volume based on minimum and maximum offsets along seismic traces of the seismic data volume. In some examples, the seed points may be generated from a decimated set of seismic traces that have a spacing of ten lines by ten traces, twenty lines by twenty traces, or any other user defined parameter within the seismic data volume. Each of the seed points, which include trace locations, a depth value, and an amplitude value of the onsets of the seismic trace, may indicate a seismic event of the seismic data volume along the seismic traces, and the seismic event may be auto-tracked as a horizon throughout an entirety of the seismic data volume.

The seed points may be used to extract horizons from the seismic data volume using waveform auto-tracking techniques. In an example, the seed points may be sorted or otherwise weighted by absolute amplitude values of the onsets of the seismic trace associated with the seed points. The horizons may be tracked from the sorted seed points in order of the absolute amplitude values to ensure that the largest and most coherent horizons are extracted first during a horizon tracking process. During the horizon tracking process, seed points that are part of any newly tracked horizons may be removed from the sorted list of seed points to eliminate redundant tracking of the same horizon during a subsequent horizon tracking iteration of the horizon extraction process. As a result, the full seismic data volume can be optimally tracked from a smaller subset of the sorted seed points. This may result in significantly faster processing time when compared to other horizon identifiers.

Further, the horizon tracking may be stopped when the tracked horizon runs into any previously tracked horizon to avoid the redundant tracking of the same horizon. In some examples, information is saved in pairs when a currently tracked horizon stops at an existing horizon. These horizons may be merged automatically based on a horizon pair relationship. For example, abutting horizons with a sufficient number of blocking points, without data overlap, and with similar dip angles may be automatically merged as being parts of the same horizon. These techniques may enable generation of subsurface structural mapping studies in hours, instead of weeks or months. Further, the techniques may unlock stratigraphic and reservoir quality information encoded in an immense number of seismic reflectors generated throughout an entirety of the seismic data volume of the seismic survey.

These illustrative examples are given to introduce the reader to the general subject matter discussed here and are not intended to limit the scope of the disclosed concepts. The following sections describe various additional features and examples with reference to the drawings in which like numerals indicate like elements but, like the illustrative examples, should not be used to limit the present disclosure.

Figure 1B:
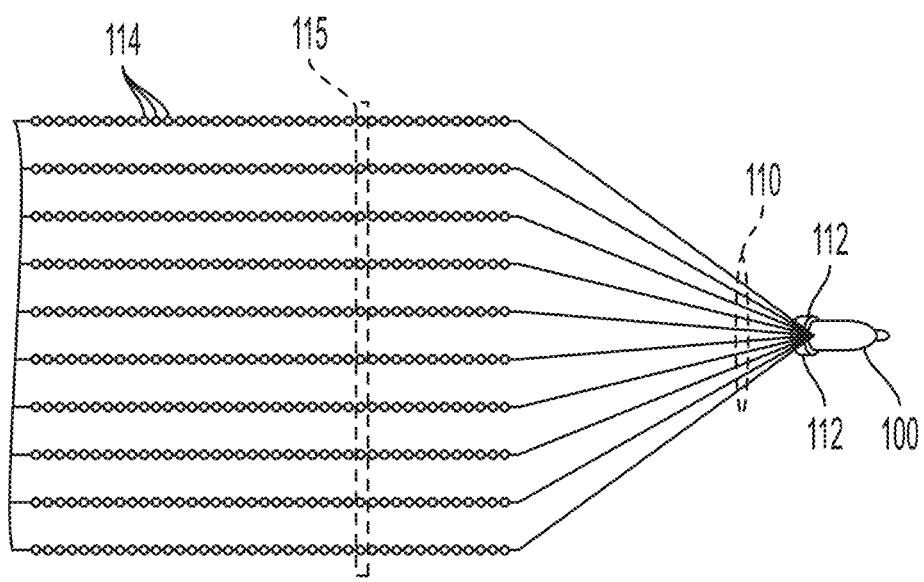
FIG. 1B is a top view of an example of the marine seismic survey environment of FIG. 1A according to some aspects of the present disclosure.

FIG. 1A is a cross-sectional view of an example of a marine seismic survey environment according to some aspects of the present disclosure, and FIG. 1B is a top view of an example of the marine seismic survey environment of FIG. 1A according to some aspects of the present disclosure. At sea, seismic survey ships 100 may deploy streamers 110 behind the ship 100. Each of the streamers 110 may trail behind the ship 100 as the ship moves in a direction 102, and each of the streamers 110 may include multiple evenly-spaced receivers 114. The streamers 110 may further include a programmable diverter 118 and programmable depth controllers that pull the streamers 110 out to an operating offset distance from a path of the ship 100 and down to a desired operating depth.

The seismic survey ship 100 may also tow one or more seismic signal sources 112. For example, the ship 100 in FIG. 1B depicts two seismic signal sources 112. As the ship 100 moves in the direction 102, the sources 112 can be triggered alternately in a so-called flip-flop pattern. The receivers 114 at a given position on the streamers 110 may be associated with a common field file trace number or common channel 115. The streamers 110 may be up to several kilometers long and may be constructed in sections 25 to 100 meters in length that include groups of up to 35 or more uniformly spaced receivers 114. Each streamer 110 may include electrical or fiber-optic cabling for interconnecting the receivers 114 and the seismic equipment on the ship 100. Data may be digitized near the receivers 114 and transmitted to the ship 100 through the cabling at rates of 7 (or more) million bits of data per second.

The sources 112 may be impulse sources or vibratory sources. The receivers 114 used in marine seismology may be referred to as hydrophones and may be constructed using a piezoelectric transducer. Various suitable types of hydrophones are may be used, such as disk hydrophones and cylindrical hydrophones. The sources 112 and the receivers 114 may be deployed below the ocean's surface 104. Processing equipment aboard the ship 100 may control the operation of the sources 112 and receivers 114 and records the acquired data.

Seismic surveys provide data for imaging below a surface 104 of the ocean to reveal subsurface structures, such as a structure 106, which lies below a floor 108 of the ocean. Analysts can employ seismic imaging methods to process the data and map the topography of the subsurface layers. Seismic survey data also reveals various other characteristics of the subsurface layers which can be used to determine the locations of oil and gas reservoirs. To image the subsurface structure 106, the source 112 emits seismic waves 116 that are reflected where there are changes in acoustic impedance due to the subsurface structure 106 (and other subsurface reflectors). The reflected waves are detected by a pattern of receivers 114. By recording (as a function of time) the arriving seismic waves 116 that have traveled from the source 112 to the subsurface structure 106 to the receivers 114, an image of the subsurface structure 106 can be obtained after appropriate data processing. The image of the subsurface structure 106 and other subsurface structures may generate a seismic data volume that represents the subsurface formations. While certain embodiments are described in connection with off-shore seismic technology, embodiments described herein are also useful with on-shore, ocean bottom, or other seismic survey arrangements.

Figure 2:
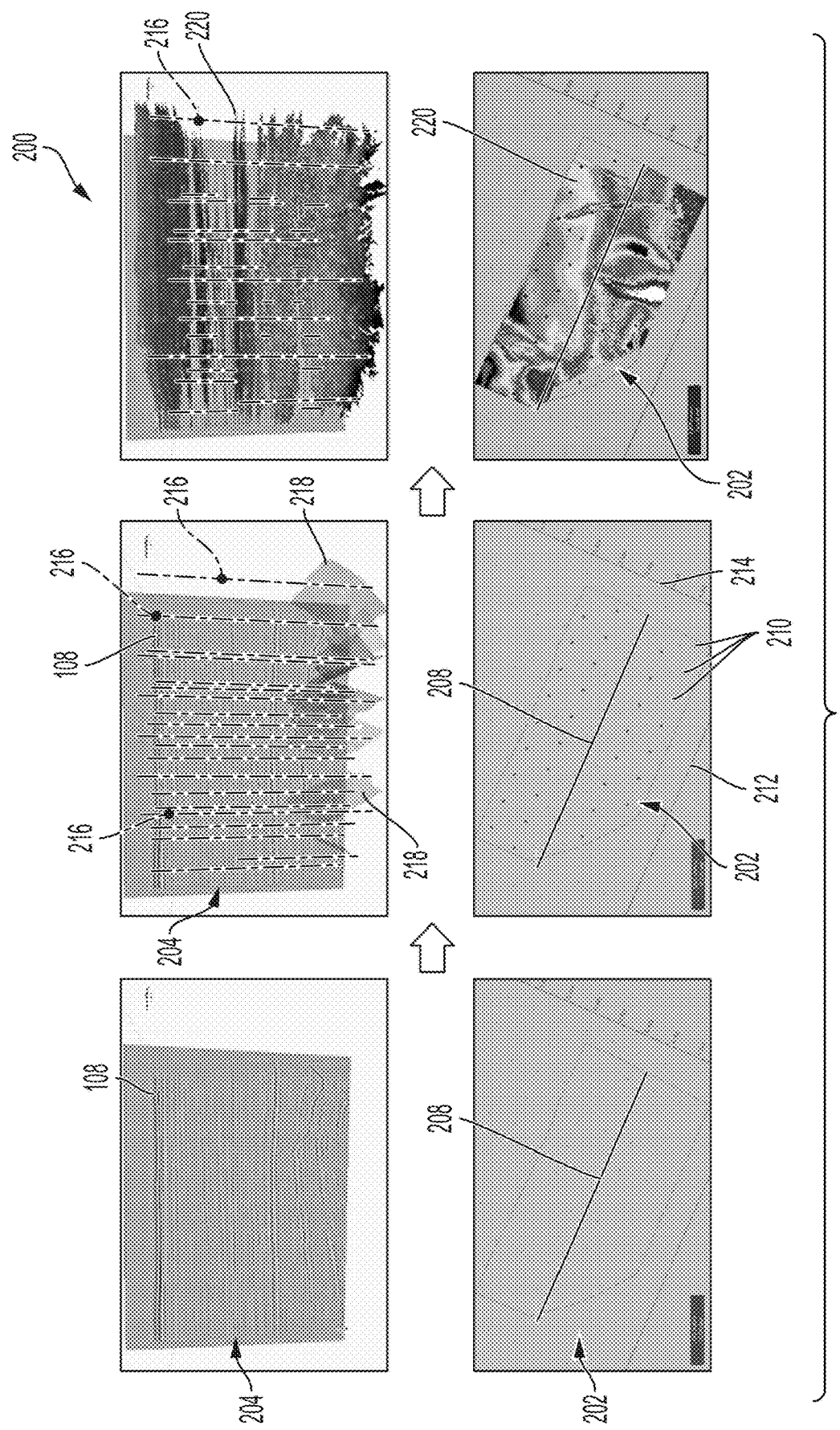
FIG. 2 is an example workflow for extracting horizons from a seismic data volume according to some aspects of the present disclosure.

FIG. 2 is an example workflow 200 for extracting horizons from a seismic data volume according to some aspects of the present disclosure. As described above with respect to FIGS. 1A and 1B, a seismic data volume for a subsurface interpretation of a region 202 may be obtained from a seismic survey procedure. A vertical section 204 of the seismic data volume is depicted. The vertical section 204 may represent a vertical or z-direction representation of the seismic data volume along a line 208 of the region 202. In an example, the seismic data volume may be made from hundreds or thousands of vertical sections similar to the vertical section 204 that represent different areas of the subsurface formations in the region 202.

In an example, seismic traces 210 may be identified within the region 202 of the seismic data volume. Each of the seismic traces 210 may be one-dimensional representations of portions of the seismic data volume. The seismic traces 210 may extend in the vertical or z-direction of the seismic data volume from a surface 108 of a subsurface formation represented by the seismic data volume. In some examples, the seismic traces 210 may be a decimated set of seismic traces. That is, the seismic traces 210 may be spaced out in a manner such that the seismic traces 210 are identified on only one out of every 10 traces of the seismic data volume in an x-direction 212 and a y-direction 214. In using the decimated set of seismic traces, the computational efficiency of processes for extracting horizons may increase as fewer data points of the seismic data volume may be initially processed.

For each of the seismic traces 210 identified in the region 202 of the seismic data volume, seed points 216 are identified along the z-direction of the seismic traces 210. The seed points 216 may represent locations of the seismic traces 210. The local maximum or minimum onset may indicate a local transition between layers of the formations represented by the seismic data volume. As depicted in FIG. 2, a dark line within the vertical section 204 may represent a local maximum onset, and a light line within the vertical section 204 may represent a local minimum onset. The seed points 216 of the seismic traces 210 may be established each time a seismic trace 210 crosses a local minimum, a local maximum, or both. The process for identifying the seed points 216 is described in further detail below with respect to FIG. 4.

In an example, indications of fault planes 218 may also be overlaid on the vertical section 204 of the seismic data volume. The indications of the fault planes 218 may be generated from the seismic data volume, and the indications of the fault planes 218 may help visualize characteristics of the subsurface formations in the seismic data volume once the horizons are also visualized in the seismic data volume.

Starting from the seed points 216 with a greatest absolute value amplitude, horizons 220 may be extracted from the seismic data volume. The horizon extraction process is described in further detail below with respect to FIG. 6. In an example, the extracted horizons 220 may be two-dimensional or three-dimensional representations of subterranean formation characteristic changes that are generated from the seed points identified along one-dimensional seismic traces 210. When the extracted horizons 220 abut other extracted horizons 220, an auto-merging process may make a determination as to whether the abutting horizons 220 should be merged as a single horizon 220. The auto-merging process is described in further detail below with respect to FIG. 8. The resulting indication of horizons 220 in the seismic data volume may contribute to subsurface interpretation and well planning within the region 202.

Figure 3:
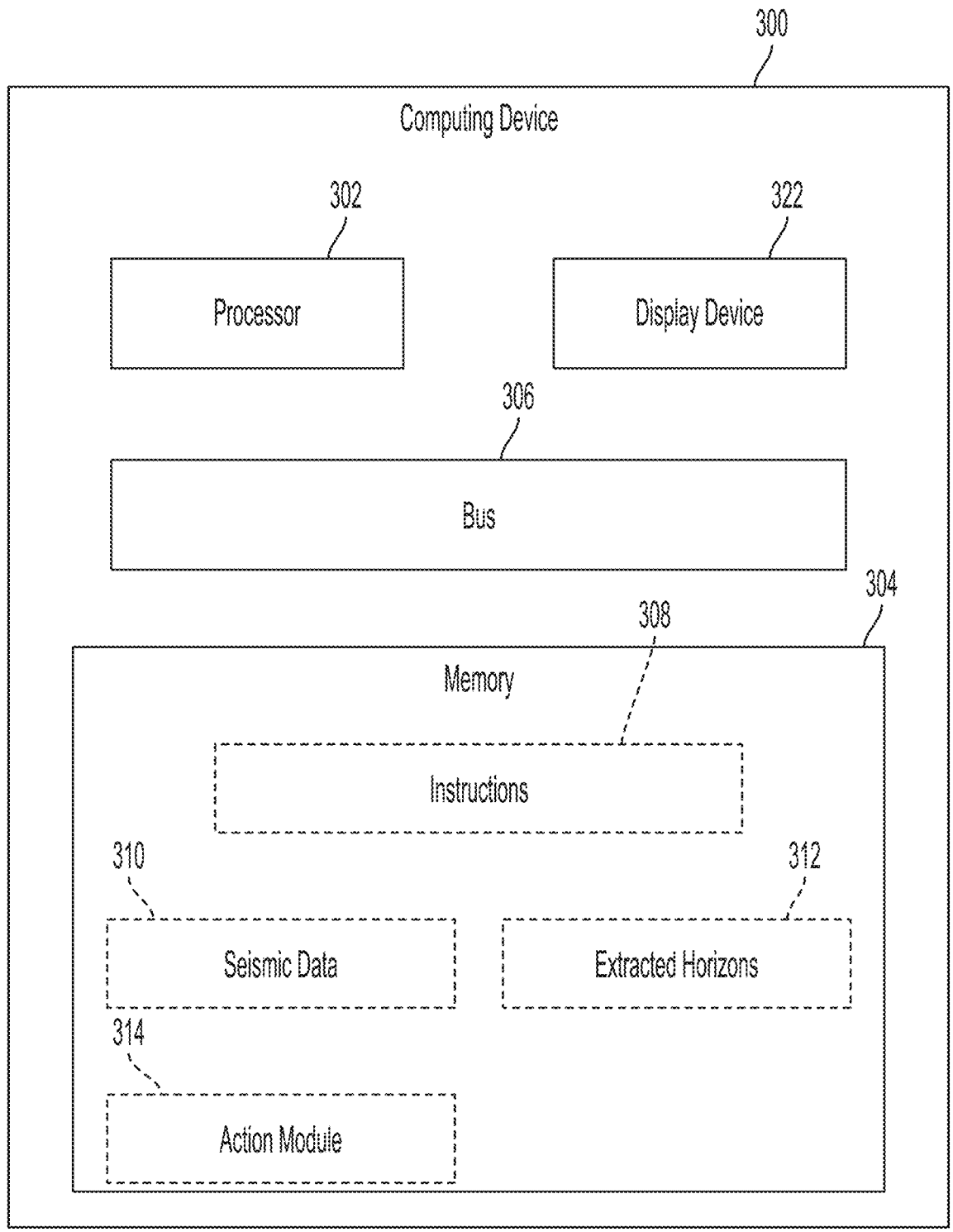
FIG. 3 is a block diagram of an example of a computing device for automated horizon extraction according to one example of the present disclosure.

FIG. 3 is a block diagram of an example of a computing device 300 for automated horizon extraction according to one example of the present disclosure. The computing device 300 can include a processor 302, a memory 304, a bus 306, and a display device 322. In some examples, the components shown in FIG. 3 can be integrated into a single structure. For example, the components can be within a single housing with a single processing device. In other examples, the components shown in FIG. 3 can be distributed (e.g., in separate housings) and in electrical communication with each other using various processors. It is also possible for the components to be distributed in a cloud computing system or grid computing system.

The processor 302 can execute one or more operations for automatically extracting horizons from seismic data volumes. The processor 302 can execute instructions 308 stored in the memory 304 to perform the operations. The processor 302 can include one processing device or multiple processing devices. Non-limiting examples of the processor 302 include a field-programmable gate array ("FPGA"), an application-specific integrated circuit ("ASIC"), a processor, a microprocessor, etc.

The processor 302 may be communicatively coupled to the memory 304 via the bus 306. The memory 304 may include any type of memory device that retains stored information when powered off. Non-limiting examples of the memory 304 include electrically erasable and programmable read-only memory ("EEPROM"), flash memory, or any other type of non-volatile memory. In some examples, at least some of the memory 304 can include a non-transitory medium from which the processor 302 can read instructions. A computer-readable medium can include electronic, optical, magnetic, or other storage devices capable of providing the processor 302 with computer-readable instructions or other program code. Non-limiting examples of a computer-readable medium include (but are not limited to) magnetic disk(s), memory chip(s), read-only memory (ROM), random-access memory ("RAM"), an ASIC, a configured processing device, optical storage, or any other medium from which a computer processing device can read instructions. The instructions can include processing device-specific instructions generated by a compiler or an interpreter from code written in any suitable computer-programming language, including, for example, C, C++, C#, etc.

In some examples, the computing device 300 includes a display device 322. The display device 322 can represent one or more components used to output data. Examples of the display device 322 can include a liquid-crystal display (LCD), a computer monitor, a touch-screen display, etc.

The memory 304 may include seismic data 310 associated with a seismic survey. In some examples, the seismic data 310 may be stored in a storage device separate from the internal memory 304 of the computing device 300 owing to a large size of the seismic data 310. Examples of seismic data 310 can include seismic data volumes, seismic data trace locations within the seismic data volumes, fault plane location indications, and any other data associated with the seismic survey. The computing device 300 can extract a set of horizons 312 that represent changes in formation characteristics, such as varying layers of rock, using the instructions 308 stored in the memory 304. In one or more examples, the set of horizons 312 may be displayed in a graphical user interface as a three-dimensional horizon representation of a subsurface formations on the display device 322. For example, the horizon representation may include the set of horizons 312 that are displayed in a three-dimensional manner on a graphical user interface of the display device 322.

In an example, the computing device 300 can adjust well plans using an action module 314 based on the set of horizons 312 extracted from the seismic data 310. For example, the set of horizons 312 may provide information about the optimal locations and routes for wells drilled within the subterranean hydrocarbon bearing formations. In other words, the set of horizons 312 may provide indications of subsurface features that may trap oil, such as faults or folds in the formations. The computing device 300 may use the action module 314 to plan the locations of wells that will be drilled into the subterranean formations to intersect with the subsurface features that may trap oil. Further, the computing device 300 may use the action module 314 to control other wellbore operations associated with well planning or well drilling based on the extracted horizons 312 from the seismic data 310.

Figure 4:
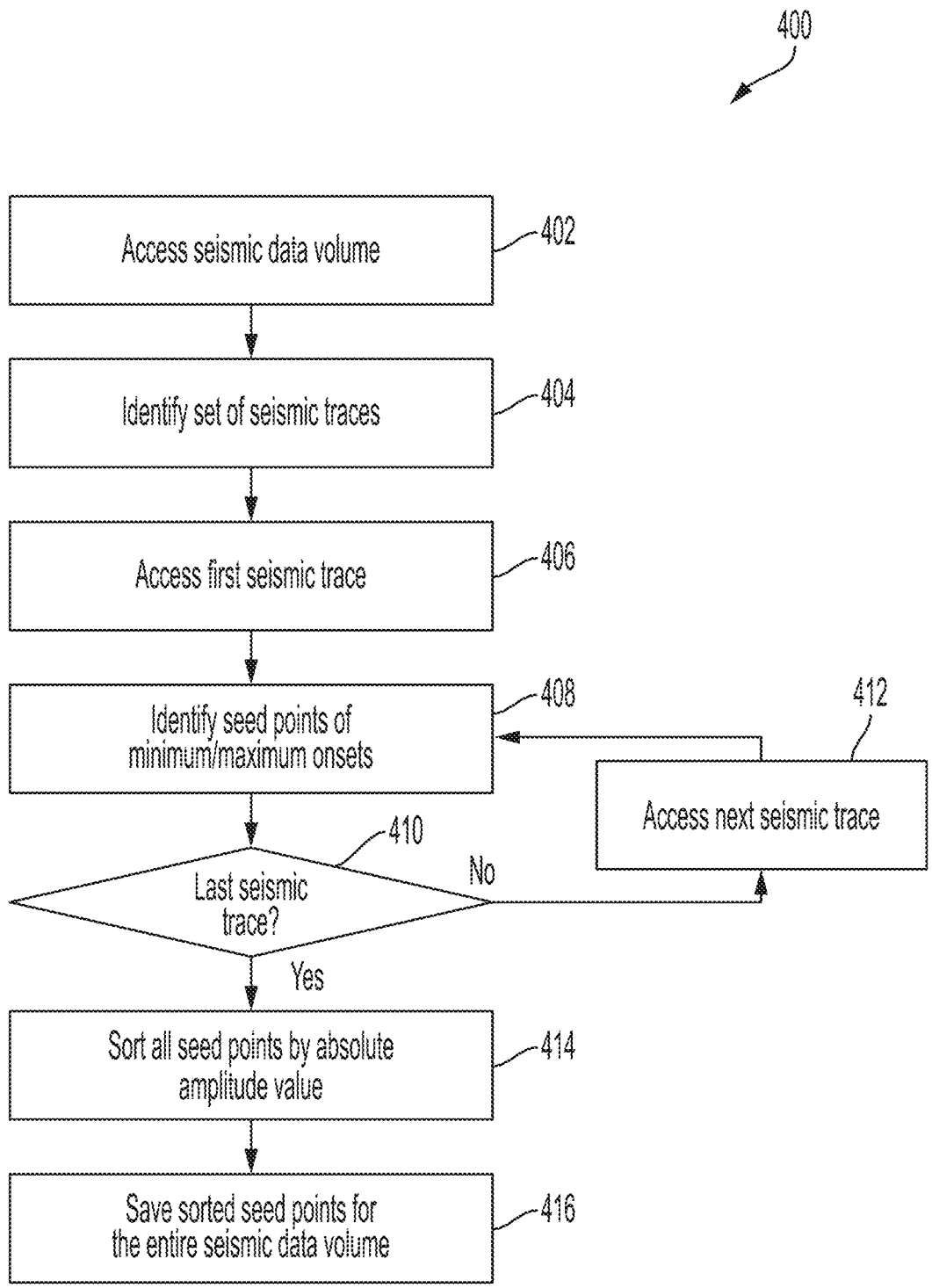
FIG. 4 is a flowchart of a process for automatically identifying seed points in a seismic data volume according to some aspects of the present disclosure.

FIG. 4 is a flowchart of a process 400 for automatically identifying the seed points 216 in the seismic data volume according to some aspects of the present disclosure. At block 402, the processor 302 of the computing device 300 can access the seismic data volume. As discussed above with respect to FIG. 1, the seismic data volume may be generated during the seismic survey for hydrocarbon exploration in the region 202.

At block 404, the processor 302 can identify a set of the seismic traces 210 in the seismic data volume. The seismic traces 210 may be identified based on the resolution of the seismic data volume. In other words, each location where a resolution line in the x-direction 212 crosses a resolution line in the y-direction 214 may include a seismic trace 210. In other examples, the seismic traces 210 may be identified as decimated seismic traces. That is, the seismic traces 210 may be identified at every tenth resolution line in the x-direction 212 and the y-direction 214.

At block 406, the processor 302 can access a first seismic trace 210. The first seismic trace 210 may be any of the seismic traces 210 identified at block 404. In some examples, the first seismic trace 210 may be a seismic trace located in a first row of a first column of the seismic traces 210 identified in the region 202.

At block 408, the processor 302 can identify seed points 216 of minimum onset, maximum onset, or both along the first seismic trace 210. The minimum onset and the maximum onset may be locations along the z-direction of the first seismic trace 210 that indicate a transition from one formation layer to another formation layer in the subterranean formations represented by the seismic data volume. The transition from one formation layer to another formation layer may be referred to as a horizon 220. The onsets may indicate signal strength of the seismic data in the seismic data volume at a particular location, such as along the seismic trace 210. A positive signal, such as a local maximum onset, or a negative signal, such as a local minimum onset, may indicate features of interest in the formations represented by the seismic data volume.

At block 410, the processor 302 can make a determination regarding whether the present trace 210 is the final trace of the set of seismic traces identified at block 404. If the present seismic trace 210 is not the final trace, then, at block 412, the processor 302 can access a next seismic trace 210 and return to block 408 to identify the seed points 216 of the next seismic trace 210. In an example, each of the seismic traces 210 identified at block 404 may be assigned a number, and the process 400 may increment through each of the seismic traces 210 numerically.

If, at block 410, the processor 302 determines that the present seismic trace 210 is the final seismic trace, then, at block 414, the processor 302 can sort the seed points 216 identified in each of the seismic traces 210 by an absolute amplitude value of the seismic trace data, such as an onset, associated with the seed points 216. Sorting the seed points 216 by their absolute amplitude value may ensure that the seed points 216 associated with the strongest seismic signals of the seismic data volume are used first in a horizon extraction process, such as a process 600 of FIG. 6. At block 416, the processor 302 can save the sorted seed points 216 for the entire seismic data volume.

Figure 5:
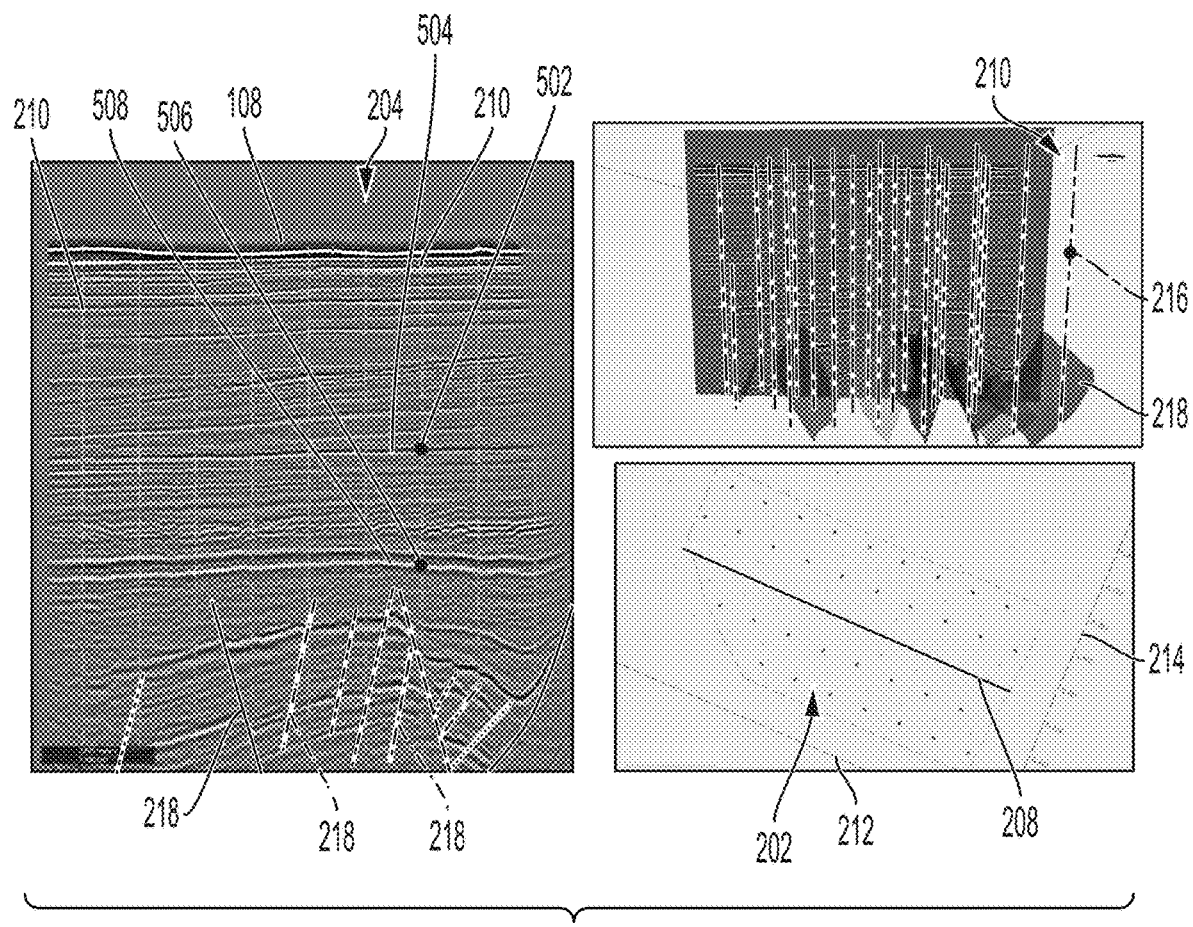
FIG. 5 is an example of identified seismic traces and seed points of a portion of a seismic data volume according to some aspects of the present disclosure.

FIG. 5 is an example of identified seismic traces 210 and seed points 216 of a portion of the seismic data volume according to some aspects of the present disclosure. The vertical section 204 of the seismic data volume is depicted with the seismic traces 210, as identified at block 404 of the process 400 described above with respect to FIG. 4. The vertical section 204 represents a vertical or z-direction representation of the seismic data volume along the line 208 of the region 202. The indications of the fault planes 218 are also shown in the vertical section 204.

The seismic traces 210 may extend in the vertical or z-direction of the seismic data volume from a surface 108 of the subsurface formations represented by the seismic data volume. In some examples, the seismic traces 210 may be decimated seismic traces. That is, the seismic traces 210 may be spaced out in a manner such that the seismic traces 210 are identified on only one out of every 10 lines in an x-direction 212 and a y-direction 214 of a grid indicating a location of the region 202.

For each of the seismic traces 210 identified in the region 202 of the seismic data volume, seed points 216 are identified along the z-direction of the seismic traces 210. The seed points 216 may represent locations of the seismic traces 210 that cross a local maximum or minimum onset of the seismic data. An example of a local maximum onset may be at point 502 in the vertical section 204. As illustrated, the point 502 is located where a seismic trace 210 crosses a dark seismic event 504 of the seismic data. An example of a local minimum onset may be at point 506 in the vertical section 204. As illustrated, the point 506 is located where the seismic trace 210 crosses a white or lightly colored seismic event 508. As described above with respect to FIG. 2, the local maximum or minimum onsets may indicate local transitions between layers of the formations represented by the seismic data volume. The seed points 216 of the seismic traces 210 may be established each time a seismic trace 210 crosses a local minimum, a local maximum, or both.

Figure 6:
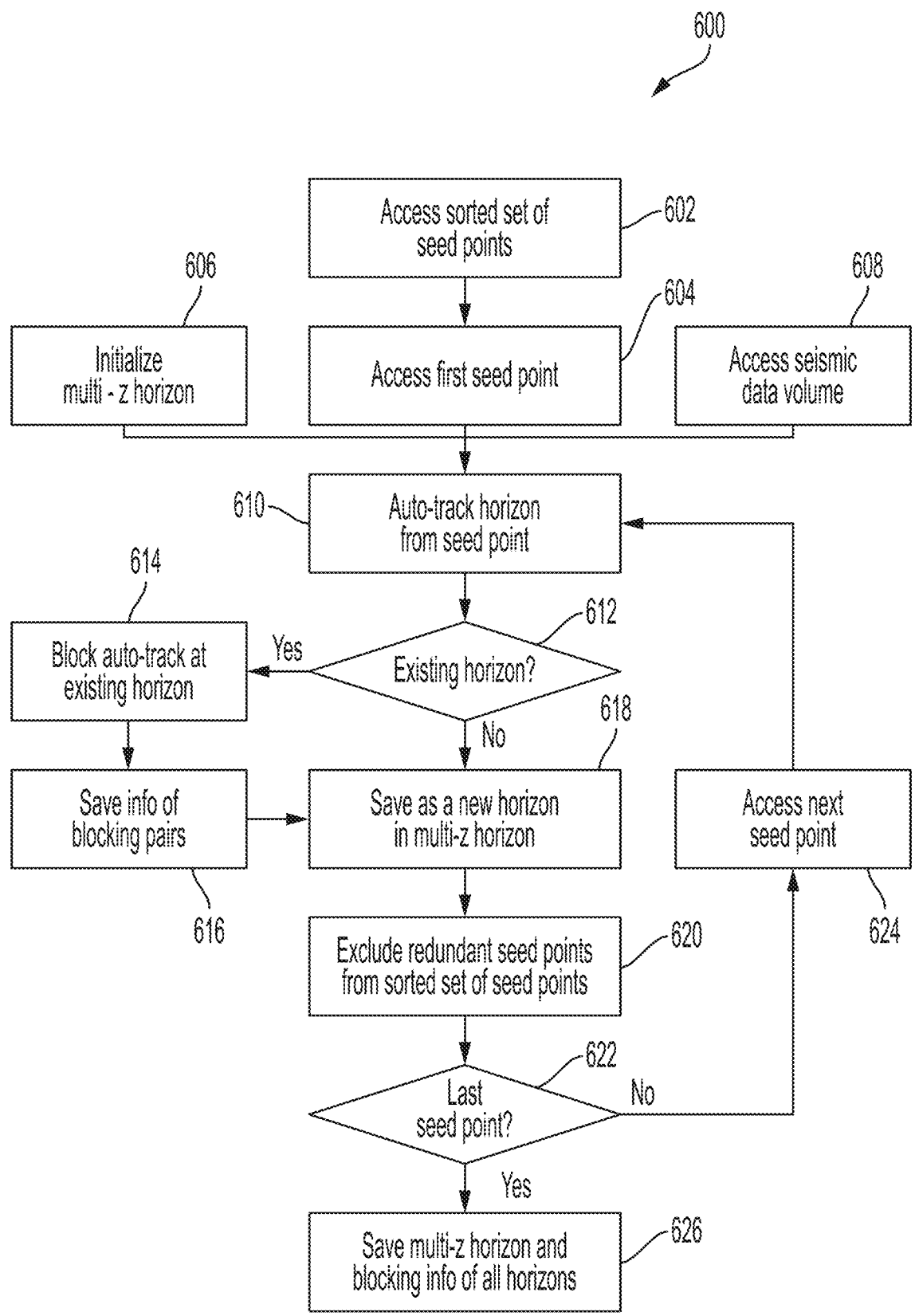
FIG. 6 is a flowchart of a process for automatically extracting the horizons from a seismic data volume according to some aspects of the present disclosure.

FIG. 6 is a flowchart of a process 600 for automatically extracting the horizons 220 from a seismic data volume according to some aspects of the present disclosure. At block 602, the processor 302 can access a sorted set of seed points 216. In an example, the sorted set of seed points 216 may be the seed points 216 identified and sorted by absolute amplitude value in the process 400 described above with respect to FIG. 4.

At block 604, the processor 302 can access a first seed point 216 of the sorted set of seed points 216. The first seed point 216 may be the seed point identified in the seismic data volume and associated with seismic data that includes the greatest absolute amplitude value. In an example, the first seed point 216 may be the seed point 216 with a greatest local maximum onset or with a smallest local minimum onset of all the seismic traces 210 in the seismic data volume. By selecting the seed point 216 with the greatest absolute amplitude value, the extraction of the horizons 220 may begin with the seed point 216 that has a strongest signal for locating the horizons 220.

At block 606, the processor 302 can initialize a multi-z horizon. The multi-z horizon may be a storage space with a memory of a computing device for storing the extracted horizons 220. For example, each extracted horizon 220 may be an individual z-layer of the multi-z horizon. Further, at block 608, the processor 302 can access the seismic data volume. The horizons 220 may be extracted from the seismic data volume associated with the seed points 216 during the process 600.

At block 610, the processor 302 can auto-track a horizon 220 from the first seed point 216. In an example, auto-tracking the horizon 220 involves assessing depth and amplitude values of minimum or maximum onsets of neighboring traces within the seismic data volume to determine if the neighboring minimum or maximum onsets form part of the horizon 220 associated with the originating seed point 216. This expansion from the seed point 216 may continue until another horizon is met or until all of the remaining neighboring minimum or maximum onsets are dissimilar from the seed point 216. For example, if an amplitude value of the neighboring minimum or maximum onset is more than 20% different from an amplitude value of the seed point 216, or a depth value of the neighboring minimum or maximum onset is more than 20 meters from a depth value of the seed point 216, then the neighboring minimum or maximum onset may be considered dissimilar and not be identified as part of the same horizon 220 as the seed point 216. Other seismic data similarity thresholds may also be used in addition to or in place of the 20% and 20 meter thresholds.

At block 612, the processor 302 can determine if the auto-tracking of block 610 has encountered an existing horizon 220 that was previously auto-tracked from another seed point 216. If the existing horizon 220 is encountered, then, at block 614, the processor 302 can block the auto-tracking process from the seed point 216 at the existing horizon 220. Further, at block 616, the processor 302 can save information about the blocking pairs of horizons 220 for a subsequent auto-merging process, such as the process 800 described below with respect to FIG. 8.

At block 618, upon saving the blocking pairs information or upon determining that no existing horizon 220 exists, the processor 302 can save the auto-tracked horizon from the seed point 216 as a new horizon 220 in the multi-z horizon that was initialized at block 606. The new horizon 220 may represent a newly identified horizon 220 within the seismic data volume. In some examples, the new horizon 220 may be merged with other horizons 220 during an auto-merging process upon completion of identifying all of the horizons 220 in the process 600.

At block 620, the processor 302 can exclude redundant seed points 216 from the sorted set of seed points 216. The redundant seed points 216 may include seed points 216 from the sorted set of seed points 216 that are located at locations that were previously auto-tracked at block 610. Because the horizon 220 has already been identified at the redundant seed points 216, further auto-tracking from the redundant seed points 216 is no longer necessary. Accordingly, the redundant seed points 216 are removed from the sorted set of seed points 216 to increase computational efficiency of the process 600.

At block 622, the processor 302 can determine if the current seed point 216 is the last seed point of the set of seed points 216 of the seismic data volume. If the current seed point 216 is not the last seed point of the set of seed points 216, then at block 624, the processor 302 can access a subsequent seed point 216 from the set of seed points 216. In an example, the subsequent seed point 216 is the next seed point 216 in the sorted set of seed points 216 after the redundant seed points 216 are removed. The subsequent seed point 216 undergoes the auto-tracking process beginning at block 610.

If the current seed point 216 is the last seed point of the set of seed points 216, then, at block 626, the processor 302 can save the multi-z horizon and the blocking information for all of the horizons 220 identified by the process 600. The blocking information may be used to determine if any of the horizons 220 that abut one another should be merged into individual horizons 220.

Figure 7:
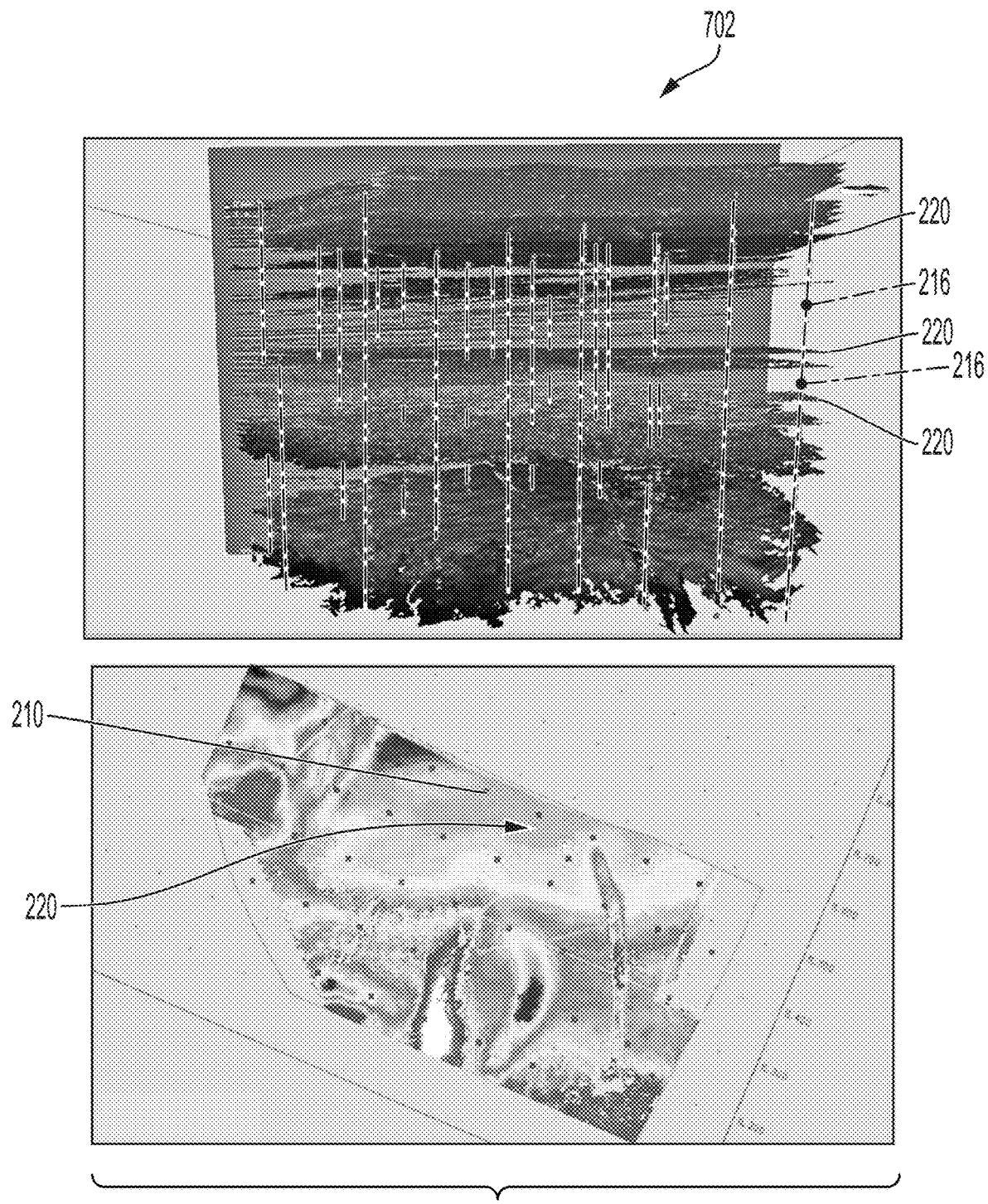
FIG. 7 is an example of extracted horizons of a portion of a seismic data volume according to some aspects of the present disclosure.

FIG. 7 is an example of the extracted horizons 220 of a portion of a seismic data volume according to some aspects of the present disclosure. As shown, a three-dimensional horizon representation 702 of the seismic data volume includes indications of the horizons 220 extracted from the seismic data volume based on locations of the seed points 216 along the seismic traces 210. The horizons 220 may be extracted from the seismic data volume using the process 600 described above with respect to FIG. 6. Further, the horizons 220 may undergo an additional auto-merging process to merge blocking pairs of the horizons 220 that were identified in the process 600. By automatically merging the blocking pairs that meet certain criteria, a more complete version of the three-dimensional horizon representation 702 of the seismic data volume may be achieved. Upon completion of the horizon extraction and the auto-merging process, the display device 322 of the computing device 300 may generate a graphical user interface that includes the three-dimensional horizon representation 702.

Figure 8:
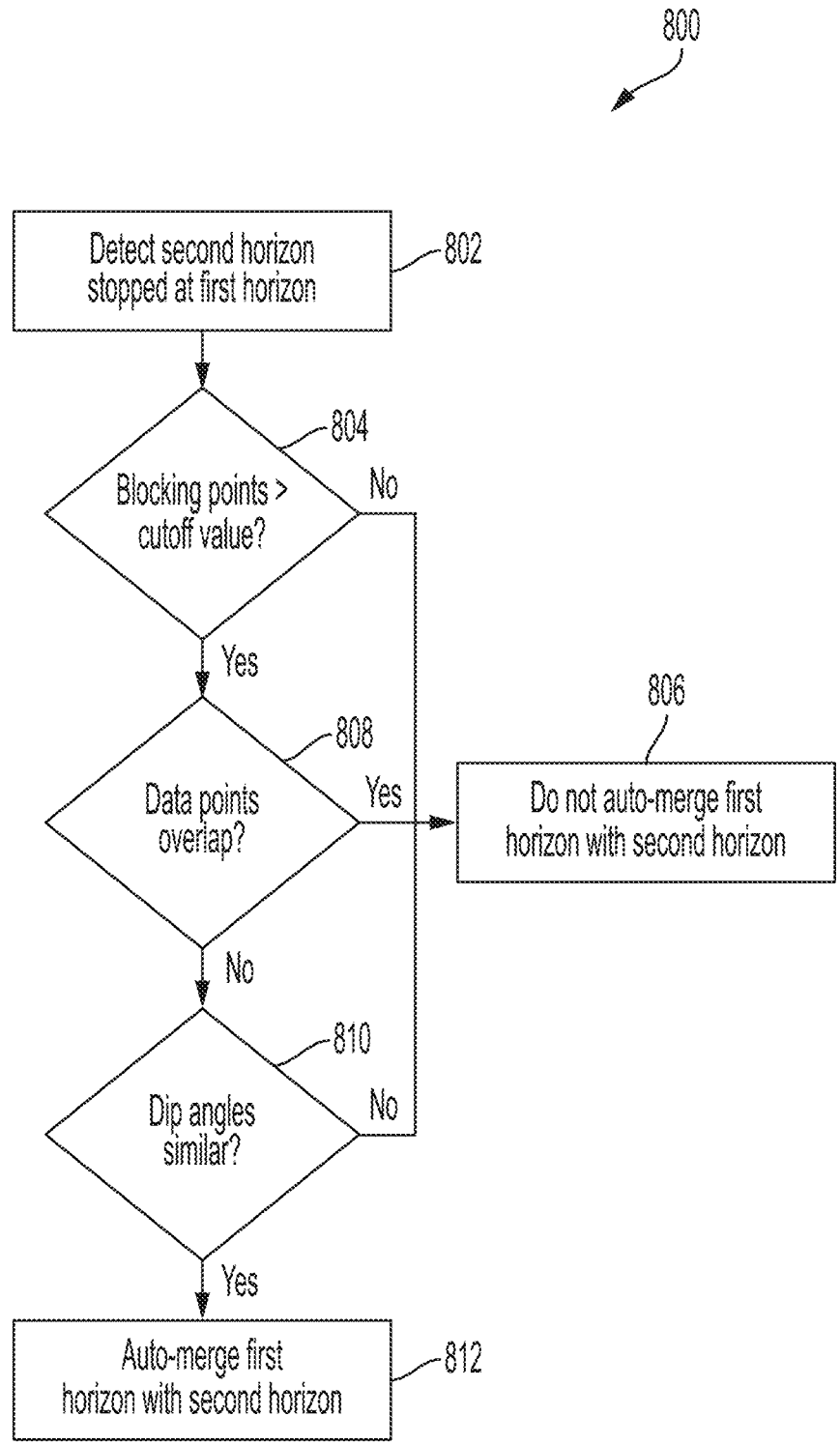
FIG. 8 is a flowchart of a process for auto-merging horizons according to some aspects of the present disclosure.

FIG. 8 is a flowchart of a process 800 for auto-merging the horizons 220 identified by the process 600 described above with respect to FIG. 6 according to some aspects of the present disclosure. At block 802, the processor 302 can detect a second horizon 220 was stopped at a first horizon 220 to form a blocking pair, as described above with respect to block 614 of the process 600. The second horizon 220 may be blocked from further auto-tracking in the process 600 when the two horizons 220 come into contact with one another during the auto-tracking process. Because the first horizon 220 and the second horizon 220 may each be part of the same overall horizon 220, further analysis may be conducted to determine if the first horizon 220 and the second horizon 220 should be automatically merged.

At block 804, the processor 302 can determine whether blocking points between the first horizon 220 and the second horizon 220 exceed a cutoff threshold. For example, the first horizon 220 and the second horizon 220 may be three-dimensional representations of changes in subterranean formations. Because the first horizon 220 and the second horizon 220 are three-dimensional, there may be a large number of blocking points where the auto-tracking process of the horizons 220 was blocked. In an example, the blocking point cutoff value may be a percentage of cutoff points relative to an overall size of the horizon 220. For example, the percentage of cutoff points relative to an overall size of the horizon 220 that meets the cutoff point criteria of block 804 may be when the number of blocking points is greater than 1% of the overall size of the horizon 220. Other percentages or raw numbers of blocking points may also be used for the cutoff value.

If the cutoff value is not met, then, at block 806, the processor 302 may decline to auto-merge the first horizon 220 and the second horizon 220. In some examples, the horizons 220 that are not auto-merged may undergo an additional manual screening process to determine if the first horizon 220 and the second horizon 220 should be manually merged. The manual screening process may be performed by a user with extensive training in seismic data analysis.

If the cutoff value is met, then, at block 808, the processor 302 may determine if any data points overlap between the first horizon 220 and the second horizon 220. For example, if one or both of the first horizon 220 and the second horizon 220 extend beyond the blocking point identified in the process 600, then a determination may be made that the first horizon 220 and the second horizon 220 include overlapping data points and belong to different horizons. In an example, the overlapping data point may occur when auto-tracking of the second horizon 220 is blocked in a middle portion of the first horizon 220 that was already tracked. If a determination is made that data points between the first horizon 220 and the second horizon 220 overlap, then, at block 806, the processor 302 may decline to auto-merge the first horizon 220 and the second horizon 220.

If a determination is made that the data points between the first horizon 220 and the second horizon 220 do not overlap, then, at block 810, the processor 302 may determine if dip angles between the first horizon 220 and the second horizon 220 are similar. The dip angle may represent an angle of the horizon 220 with respect to a reference angle. For example, the dip angle of the horizons 220 may be determined with respect to the x-y plane of the seismic data volume. If the dip angle of the first horizon 220 is similar to the dip angle of the second horizon 220, it may indicate that the first horizon 220 and the second horizon 220 are each part of the same horizon. In an example, the dip angles may be considered similar if the dip angles fall within 30% to 40% of one another. Other threshold percentages may also be used. For example, the threshold may be within a 10% dip angle similarity to meet the requirement of block 810, or the threshold may be greater than a 40% dip angle similarity to meet the requirement of block 810.

If a determination is made that the dip angles are not similar, then, at block 806, the processor 302 may decline to auto-merge the first horizon 220 and the second horizon 220. If a determination is made that the dip angles are similar, then, at block 812, the processor 302 can auto-merge the first horizon 220 with the second horizon 220. The process 800 may be repeated for each blocking pair of horizons 220 identified in the process 600 described above with respect to FIG. 6 to determine if each of the blocking pairs of the horizons 220 meet the auto-merging criteria of the process 800.

Figure 9:
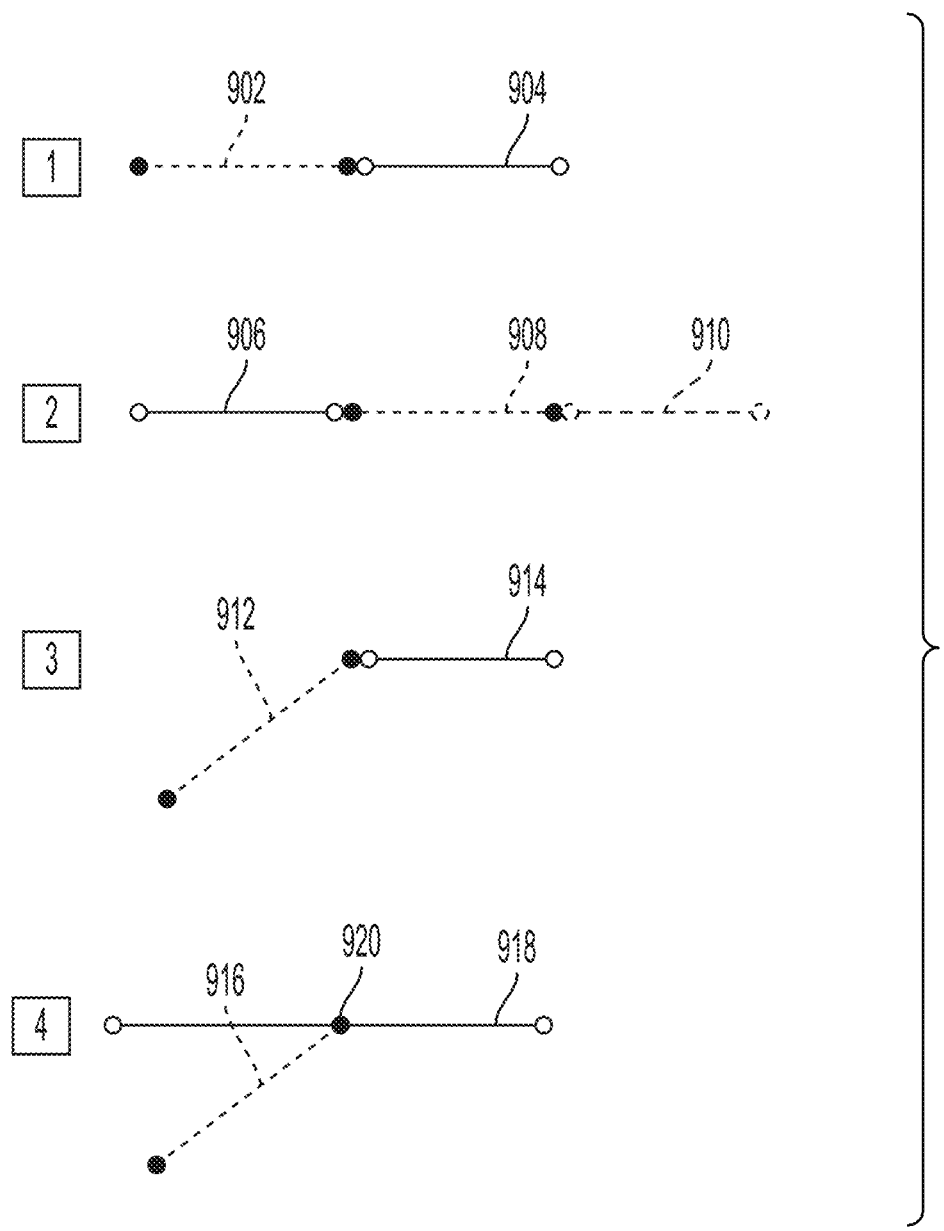
FIG. 9 is a set of examples of auto-merging horizons according to some aspects of the present disclosure.

FIG. 9 is a set of examples of auto-merging the horizons 220 according to some aspects of the present disclosure. In a first example, a horizon 902 is blocked at a horizon 904. The horizon 902 appears to not have any overlapping data points with the horizon 904, and the horizon 902 appears to have the same or a very similar dip angle as the horizon 904. Assuming that a three-dimensional representation of the horizon 902 being blocked at the horizon 904 includes a sufficient number of blocking points, as described above with respect to block 804 of the process 800, then the horizon 902 may be auto-merged with the horizon 904 based on the two horizons meeting the requirements established in the process 800.

In a second example, a horizon 906 is blocked at a horizon 908, and the horizon 908 is blocked at a horizon 910. The horizons 906, 908, and 910 appear to not have any overlapping data points with each other, and the horizons 906, 908, and 910 appear to have the same or a very similar dip angle as one another. Assuming that a three-dimensional representation of the horizons 906, 908, and 910 includes a sufficient number of blocking points, as described above with respect to block 804 of the process 800, then the horizons 906, 908, and 910 may be auto-merged with each other because the three horizons meet the requirements established in the process 800.

In a third example, a horizon 912 is blocked at a horizon 914. The horizon 912 appears to not have any overlapping data points with the horizon 914, but the horizon 912 appears to have a different dip angle from the horizon 914. If the dip angle difference exceeds a threshold amount, such as a difference of more than 20%, then the horizon 912 may not be auto-merged with the horizon 914 because the two horizons would not meet at least the dip angle similarity requirements established in the process 800.

In a fourth example, a horizon 916 is blocked at a horizon 918. The horizon 918 includes data points that overlap a blocking point 920 of the horizon 916. In other words, the horizon 918 extends in multiple directions from the blocking point 920. Because the horizon 918 is not blocked at the blocking point 920 in a similar fashion as the horizon 916, the two horizons 916 and 918 are likely not part of the same horizon. Accordingly, the horizon 916 may not be auto-merged with the horizon 918 because the overlapping data points would not meet at least the overlapping data point requirement established in the process 800. In an event where the horizons are not auto-merged, a subsequent manual merging process may be performed by a person trained to analyze seismic data. Such a process may confirm that the horizons should not be merged or may override the automated decision to not merge the horizons.

In some aspects, systems, methods, and non-transitory computer-readable mediums for automatically extracting horizons from seismic data are provided according to one or more of the following examples:

As used below, any reference to a series of examples is to be understood as a reference to each of those examples disjunctively (e.g., "Examples 1-4" is to be understood as "Examples 1, 2, 3, or 4").

Example 1 is a system comprising: a processor; and a memory including instructions that are executable by the processor for causing the processor to: receive a seismic data volume comprising seismic information of subterranean formations; receive a set of seismic traces of the seismic data volume; along each seismic trace of the set of seismic traces, determine a set of seed points comprising minimum or maximum onsets; sort the set of seed points into a sorted set of seed points by absolute amplitude values of the minimum or maximum onsets associated with the set of seed points; automatically track a set of horizons of the seismic data volume from the sorted set of seed points in an order of the absolute amplitude values of the sorted set of seed points to generate a horizon representation of the seismic data volume; and generate a graphical user interface that includes the horizon representation for display on a display device.

Example 2 is the system of example 1, wherein the seismic traces comprise one-dimensional representations of portions of the seismic data volume, and wherein the set of horizons are automatically tracked from the one-dimensional representations of the portions of the seismic data volume to generate three-dimensional representations of the set of horizons of the subterranean formations.

Example 3 is the system of examples 1-2, wherein the instructions are further executable by the processor for causing the processor to: automatically merge a first tracked horizon of the seismic data volume with a second tracked horizon of the seismic data volume to generate a combined horizon upon determining that the first tracked horizon and the second tracked horizon meet at least one auto-merging criteria.

Example 4 is the system of example 3, wherein the auto-merging criteria comprise a number of blocking points between the first tracked horizon and the second tracked horizon exceeding a cutoff value, a lack of overlapping data points between the first tracked horizon and the second tracked horizon, a first dip angle of the first tracked horizon and a second dip angle of the second tracked horizon being within 30% to 40% of one another, or any combination thereof.

Example 5 is the system of examples 1-4, wherein the instructions to automatically track the set of horizons of the seismic data volume from the set of seed points in an order of the absolute amplitude values of the set of seed points to generate a horizon representation of the seismic data volume further causes the processor to: identify a first seed point of the sorted set of seed points; automatically track a first horizon of the set of horizons; identify additional seed points of the sorted set of seed points tracked in the first horizon; and exclude the additional seed points from the sorted set of seed points prior to automatically tracking a second horizon of the set of horizons from a second seed point of the sorted set of seed points.

Example 6 is the system of examples 1-5, wherein instructions to automatically track the set of horizons of the seismic data volume from the sorted set of seed points further causes the processor to: identify a first seed point of the sorted set of seed points; automatically assign a first neighboring point of the first seed point as part of a first horizon, wherein the first neighboring point comprises a first onset that is within 20% of a first seed onset of the first seed point and a first depth value that is within 20 meters from a first seed depth value of the first seed point; and automatically assign a second neighboring point of the first neighboring point as part of the first horizon, wherein the second neighboring point comprises a second onset that is within 20% of the first seed onset of the first seed point and a second depth value that is within 20 meters from the first seed depth value of the first seed point.

Example 7 is the system of examples 1-6, wherein instructions to automatically track the set of horizons of the seismic data volume from the sorted set of seed points further causes the processor to: stop automatically tracking a second horizon of the set of horizons where the second horizon abuts a first horizon that was previously tracked; and upon determining that a set of auto-merging criteria between the first horizon and the second horizon is met, auto-merging the first horizon and the second horizon into a common horizon.

Example 8 is the system of examples 1-7, wherein the seismic traces of the seismic data volume comprise decimated seismic traces.

Example 9 is a method comprising: receiving a seismic data volume comprising seismic information of subterranean formations; receiving a set of seismic traces of the seismic data volume; along each seismic trace of the set of seismic traces, determining a set of seed points comprising minimum or maximum onsets; sorting the set of seed points into a sorted set of seed points by absolute amplitude values of the onsets associated with the set of seed points; and generating a horizon representation of the seismic data volume by automatically tracking horizons of the seismic data volume from the sorted set of seed points in an order of the absolute amplitude values of the sorted set of seed points.

Example 10 is the method of example 9, further comprising: planning a location and route of one or more wells drilled within the subterranean formations using the horizon representation of the seismic data volume.

Example 11 is the method of examples 9-10, further comprising: automatically merging a first tracked horizon of the seismic data volume with a second tracked horizon of the seismic data volume to generate a combined horizon upon determining that the first tracked horizon and the second tracked horizon meet at least one auto-merging criteria.

Example 12 is the method of examples 9-11, wherein automatically tracking the horizons of the seismic data volume comprises: identifying a first seed point of the sorted set of seed points; automatically tracking a first horizon of the horizons; identifying additional seed points of the sorted set of seed points tracked in the first horizon; and excluding the additional seed points from the sorted set of seed points prior to automatically tracking a second horizon of the horizons from a second seed point of the sorted set of seed points.

Example 13 is the method of examples 9-12, wherein automatically tracking the horizons of the seismic data volume comprises: identifying a first seed point of the sorted set of seed points; automatically assigning a first neighboring point of the first seed point as part of a first horizon, wherein the first neighboring point comprises a first onset that is within 20% of a first seed onset of the first seed point and a first depth value that is within 20 meters from a first seed depth value of the first seed point; and automatically assign a second neighboring point of the first neighboring point as part of the first horizon, wherein the second neighboring point comprises a second onset that is within 20% of the first seed onset of the first seed point and a second depth value that is within 20 meters from the first seed depth value of the first seed point.

Example 14 is the method of examples 9-13, wherein automatically tracking the horizons of the seismic data volume comprises: blocking automatic tracking of a second horizon of the horizons where the second horizon abuts a first horizon that was previously tracked; and upon determining that a set of auto-merging criteria between the first horizon and the second horizon is met, auto-merging the first horizon and the second horizon into a common horizon.

Example 15 is the method of examples 9-14, wherein the seismic traces of the seismic data volume comprise decimated seismic traces.

Example 16 is a non-transitory computer-readable medium comprising program code that is executable by a processor for causing the processor to: receive a seismic data volume comprising seismic information of subterranean formations; receive a set of seismic traces of the seismic data volume; along each seismic trace of the set of seismic traces, determine a set of seed points comprising minimum or maximum onsets; sort the set of seed points into a sorted set of seed points by absolute amplitude values of the onsets associated with the set of seed points; automatically track a set of horizons of the seismic data volume from the sorted set of seed points in an order of the absolute amplitude values of the sorted set of seed points to generate a horizon representation of the seismic data volume; and plan a location and route of one or more wells drilled within the subterranean formation using the horizon representation of the seismic data volume.

Example 17 is the non-transitory computer-readable medium of example 16, further comprising program code that is executable by the processor for causing the processor to: automatically merge a first tracked horizon of the set of horizons with a second tracked horizon of the set of horizons to generate a combined horizon upon determining that the first tracked horizon and the second tracked horizon meet at least one auto-merging criteria.

Example 18 is the non-transitory computer-readable medium of examples 17, wherein the auto-merging criteria comprise a number of blocking points between the first tracked horizon and the second tracked horizon exceeding a cutoff value, a lack of overlapping data points between the first tracked horizon and the second tracked horizon, and a first dip angle of the first tracked horizon and a second dip angle of the second tracked horizon being within 30% to 40% of one another.

Example 19 is the non-transitory computer-readable medium of examples 16-18, wherein the program code to automatically track the set of horizons of the seismic data volume from the set of seed points is further executable by the processor to cause the processor to: identify a first seed point of the sorted set of seed points; automatically track a first horizon of the set of horizons; identify additional seed points of the sorted set of seed points tracked in the first horizon; and exclude the additional seed points from the sorted set of seed points prior to automatically tracking a second horizon of the set of horizons from a second seed point of the sorted set of seed points.

Example 20 is the non-transitory computer-readable medium of examples 16-19, wherein the program code to automatically track the set of horizons of the seismic data volume from the set of seed points is further executable by the processor to cause the processor to: identify a first seed point of the sorted set of seed points; automatically assign a first neighboring point of the first seed point as part of a first horizon, wherein the first neighboring point comprises a first onset that is within 20% of a first seed onset of the first seed point and a first depth value that is within 20 meters from a first seed depth value of the first seed point; and automatically assign a second neighboring point of the first neighboring point as part of the first horizon, wherein the second neighboring point comprises a second onset that is within 20% of the first seed onset of the first seed point and a second depth value that is within 20 meters from the first seed depth value of the first seed point.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure. For instance, any examples described herein can be combined with any other examples to yield further examples.

The invention claimed is:
1. A system comprising:
a processor; and
a memory including instructions that are executable by the processor for causing the processor to:
receive a seismic data volume comprising seismic information of subterranean formations;

receive a set of seismic traces of the seismic data volume;
along each seismic trace of the set of seismic traces, automatically, without a user input, determine a set of seed points comprising minimum or maximum onsets;
sort the set of seed points into a sorted set of seed points by absolute amplitude values of the minimum or maximum onsets associated with the set of seed points;
automatically track a set of horizons of the seismic data volume from the sorted set of seed points in an order of the absolute amplitude values of the sorted set of seed points to generate a horizon representation of the seismic data volume; and
generate a graphical user interface that includes the horizon representation for display on a display device.

2. The system of claim 1, wherein the seismic traces comprise one-dimensional representations of portions of the seismic data volume, and wherein the set of horizons are automatically tracked from the one-dimensional representations of the portions of the seismic data volume to generate three-dimensional representations of the set of horizons of the subterranean formations.

3. The system of claim 1, wherein the instructions are further executable by the processor for causing the processor to:
automatically merge a first tracked horizon of the seismic data volume with a second tracked horizon of the seismic data volume to generate a combined horizon upon determining that the first tracked horizon and the second tracked horizon meet at least one auto-merging criteria.

4. The system of claim 3, wherein the auto-merging criteria comprise a number of blocking points between the first tracked horizon and the second tracked horizon exceeding a cutoff value, a lack of overlapping data points between the first tracked horizon and the second tracked horizon, a first dip angle of the first tracked horizon and a second dip angle of the second tracked horizon being within 30% or 40% of one another, or any combination thereof.

5. The system of claim 1, wherein the instructions to automatically track the set of horizons of the seismic data volume from the set of seed points in an order of the absolute amplitude values of the set of seed points to generate a horizon representation of the seismic data volume further causes the processor to:
identify a first seed point of the sorted set of seed points;
automatically track a first horizon of the set of horizons;
identify additional seed points of the sorted set of seed points tracked in the first horizon; and
exclude the additional seed points from the sorted set of seed points prior to automatically tracking a second horizon of the set of horizons from a second seed point of the sorted set of seed points.

6. The system of claim 1, wherein instructions to automatically track the set of horizons of the seismic data volume from the sorted set of seed points further causes the processor to:
identify a first seed point of the sorted set of seed points;
automatically assign a first neighboring point of the first seed point as part of a first horizon, wherein the first neighboring point comprises a first onset that is within 20% of a first seed onset of the first seed point and a first depth value that is within 20 meters from a first seed depth value of the first seed point; and
automatically assign a second neighboring point of the first neighboring point as part of the first horizon, wherein the second neighboring point comprises a second onset that is within 20% of the first seed onset of the first seed point and a second depth value that is within 20 meters from the first seed depth value of the first seed point.

7. The system of claim 1, wherein instructions to automatically track the set of horizons of the seismic data volume from the sorted set of seed points further causes the processor to:
stop automatically tracking a second horizon of the set of horizons where the second horizon abuts a first horizon that was previously tracked; and
upon determining that a set of auto-merging criteria between the first horizon and the second horizon is met, auto-merging the first horizon and the second horizon into a common horizon.

8. The system of claim 1, wherein the seismic traces of the seismic data volume comprise decimated seismic traces.

9. A method comprising:
receiving a seismic data volume comprising seismic information of subterranean formations;
receiving a set of seismic traces of the seismic data volume;
along each seismic trace of the set of seismic traces, automatically, without a user input, determining a set of seed points comprising minimum or maximum onsets;
sorting the set of seed points into a sorted set of seed points by absolute amplitude values of the onsets associated with the set of seed points; and
generating a horizon representation of the seismic data volume by automatically tracking horizons of the seismic data volume from the sorted set of seed points in an order of the absolute amplitude values of the sorted set of seed points.

10. The method of claim 9, further comprising:
planning a location and route of one or more wells drilled within the subterranean formations using the horizon representation of the seismic data volume.

11. The method of claim 9, further comprising:
automatically merging a first tracked horizon of the seismic data volume with a second tracked horizon of the seismic data volume to generate a combined horizon upon determining that the first tracked horizon and the second tracked horizon meet at least one auto-merging criteria.

12. The method of claim 9, wherein automatically tracking the horizons of the seismic data volume comprises:
identifying a first seed point of the sorted set of seed points;
automatically tracking a first horizon of the horizons;
identifying additional seed points of the sorted set of seed points tracked in the first horizon; and
excluding the additional seed points from the sorted set of seed points prior to automatically tracking a second horizon of the horizons from a second seed point of the sorted set of seed points.

13. The method of claim 9, wherein automatically tracking the horizons of the seismic data volume comprises:
identifying a first seed point of the sorted set of seed points;
automatically assigning a first neighboring point of the first seed point as part of a first horizon, wherein the first neighboring point comprises a first onset that is within 20% of a first seed onset of the first seed point and a first depth value that is within 20 meters from a first seed depth value of the first seed point; and automatically assign a second neighboring point of the first neighboring point as part of the first horizon, wherein the second neighboring point comprises a second onset that is within 20% of the first seed onset of the first seed point and a second depth value that is within 20 meters from the first seed depth value of the first seed point.

14. The method of claim 9, wherein automatically tracking the horizons of the seismic data volume comprises:
   blocking automatic tracking of a second horizon of the horizons where the second horizon abuts a first horizon that was previously tracked; and
   upon determining that a set of auto-merging criteria between the first horizon and the second horizon is met, auto-merging the first horizon and the second horizon into a common horizon.

15. The method of claim 9, wherein the seismic traces of the seismic data volume comprise decimated seismic traces.

16. A non-transitory computer-readable medium comprising program code that is executable by a processor for causing the processor to:
   receive a seismic data volume comprising seismic information of subterranean formations;
   receive a set of seismic traces of the seismic data volume;
   along each seismic trace of the set of seismic traces, automatically, without a user input, determine a set of seed points comprising minimum or maximum onsets;
   sort the set of seed points into a sorted set of seed points by absolute amplitude values of the onsets associated with the set of seed points;
   automatically track a set of horizons of the seismic data volume from the sorted set of seed points in an order of the absolute amplitude values of the sorted set of seed points to generate a horizon representation of the seismic data volume; and
   plan a location and route of one or more wells drilled within the subterranean formation using the horizon representation of the seismic data volume.

17. The non-transitory computer-readable medium of claim 16, further comprising program code that is executable by the processor for causing the processor to:
   automatically merge a first tracked horizon of the set of horizons with a second tracked horizon of the set of horizons to generate a combined horizon upon determining that the first tracked horizon and the second tracked horizon meet at least one auto-merging criteria.

18. The non-transitory computer-readable medium of claim 17, wherein the auto-merging criteria comprise a number of blocking points between the first tracked horizon and the second tracked horizon exceeding a cutoff value, a lack of overlapping data points between the first tracked horizon and the second tracked horizon, and a first dip angle of the first tracked horizon and a second dip angle of the second tracked horizon being within 30% or 40% of one another.

19. The non-transitory computer-readable medium of claim 16, wherein the program code to automatically track the set of horizons of the seismic data volume from the set of seed points is further executable by the processor to cause the processor to:
   identify a first seed point of the sorted set of seed points;
   automatically track a first horizon of the set of horizons;
   identify additional seed points of the sorted set of seed points tracked in the first horizon; and
   exclude the additional seed points from the sorted set of seed points prior to automatically tracking a second horizon of the set of horizons from a second seed point of the sorted set of seed points.

20. The non-transitory computer-readable medium of claim 16, wherein the program code to automatically track the set of horizons of the seismic data volume from the set of seed points is further executable by the processor to cause the processor to:
   identify a first seed point of the sorted set of seed points;
   automatically assign a first neighboring point of the first seed point as part of a first horizon, wherein the first neighboring point comprises a first onset that is within 20% of a first seed onset of the first seed point and a first depth value that is within 20 meters from a first seed depth value of the first seed point; and
   automatically assign a second neighboring point of the first neighboring point as part of the first horizon, wherein the second neighboring point comprises a second onset that is within 20% of the first seed onset of the first seed point and a second depth value that is within 20 meters from the first seed depth value of the first seed point.

* * * * *